(12) United States Patent
Pinney

(10) Patent No.: US 8,270,039 B2
(45) Date of Patent: Sep. 18, 2012

(54) SYSTEM AND METHOD FOR REDUCING TONER USAGE IN PRINTING AND CUTTING APPLICATIONS

(75) Inventor: Shaun Pinney, Fremont, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 867 days.

(21) Appl. No.: 12/348,373

(22) Filed: Jan. 5, 2009

(65) Prior Publication Data
US 2010/0171992 A1 Jul. 8, 2010

(51) Int. Cl.
*H04N 1/40* (2006.01)
(52) U.S. Cl. .................. 358/3.29; 358/1.9; 358/1.15
(58) Field of Classification Search .................. None
See application file for complete search history.

(56) References Cited

U.S. PATENT DOCUMENTS

| | | |
|---|---|---|
| 7,336,912 B2 | 2/2008 | Yamauchi et al. |
| 2002/0054301 A1 | 5/2002 | Iwai et al. |
| 2006/0210296 A1 | 9/2006 | Sakata et al. |
| 2008/0141885 A1 | 6/2008 | Hu |
| 2008/0225339 A1 * | 9/2008 | Genda .................. 358/1.18 |

FOREIGN PATENT DOCUMENTS

JP 2005-335149 * 12/2005

* cited by examiner

*Primary Examiner* — Twyler Haskins
*Assistant Examiner* — Christopher D Wait
(74) *Attorney, Agent, or Firm* — Buchanan Ingersoll & Rooney PC

(57) ABSTRACT

An image forming method includes marking a cutting pattern over an image to be printed, designating portions of the cutting pattern as a portion to be kept in the image to be printed and a portion to be discarded, creating an image mask using information of the designated portions, applying the image mask to create a modified image in which the portion to be kept is exposed and the portion to be discarded is hidden by the image mask, applying colorant only to the portion to be kept of the modified image, which is exposed by the image mask, to create an outputted image with colorant only on the portion to be kept, and cutting away the portion to be discarded of the modified image, which is hidden by the image mask, so that the portion to be discarded is not included in the outputted image.

10 Claims, 8 Drawing Sheets

User Marks Cutouts and Sets Margins     Cut Image     Print on Color Paper     Final Result

SYSTEM AND METHOD FOR REDUCING TONER USAGE IN PRINTING AND CUTTING APPLICATIONS

BACKGROUND

1. Field of the Invention

The present invention relates to an image forming system, an image forming method and an image forming control program which can minimize the waste of colorants when outputting a printed image. In particular, the present invention relates to an image forming system, an image forming method and an image forming control program which can minimize the application of colorants, such as ink, toner, dyes, pigments, etc., on unnecessary or discarded cutouts of an outputted printed image.

2. Description of Related Art

In many image forming processes, a finished product is obtained by printing to media and cutting portions of the printed result. In these and other processes involving printing, colorant costs are a consideration. By reducing colorant usage, the cost of producing a finished product can be decreased. In a processes involving cutting an image after the image is output, the printed media is sent to a cutter which cuts the media to a user's specifications. After cutting, a sorting process is performed to keep the desired cutouts and to discard the undesired cutouts. In such a process, having colorant present on the undesired cutouts that are discarded is unnecessary, wastes colorant and increases printing costs.

One approach to removing colorants from discarded areas of the printed media is to require users to manually edit the print image to remove images from areas intended to be discarded. However, editing an original print image is often not desired because important information may be present in the original image which should not be discarded. Also, creating a copy of the print image solely to remove colors from discarded areas is tedious and time-consuming for the user. Even with such a hand-modified "colorant-optimized" copy of the print image, changes to the copy can be very difficult to make as circumstances or requirements change. For example, if the cut image is changed, it becomes necessary to re-edit the copy to remove colorant from newly discarded areas and to restore colorant to previously discarded areas. It is very tedious for users to perform these manual steps, and the last step of re-editing the copy is very difficult without the original print image. Thus, there is a considerable amount of tedious work required by the user to ensure colorant usage is not wasted, especially for large collections of documents.

SUMMARY

The present invention has been made in consideration of the above issues, and provides an image forming system, an image forming method and an image forming control program which enables a user to easily specify areas of an image to be printed and subsequently cut as areas to be kept and areas to be discarded, and to automatically prevent colorants, such as ink, toner, dyes, pigments, etc., from being printed on the areas to be discarded. As a result, the waste of colorant can be minimized when outputting a printed image. Minimizing the wasteful use of unnecessary colorant on discarded areas of the image to be printed reduces the amount of colorant used in a printing operation, thereby reducing printing costs.

According to a preferred embodiment, there is provided an image forming system which comprises a graphics design tool that receives an image to be printed, marks a cutting pattern over the image to be printed, and generates a cut image by designating portions of the cutting pattern as at least one portion to be kept in the image to be printed and at least one portion to be discarded in the image to be printed, a driver unit that receives the cut image including information of the at least one designated portion to be kept and the at least one designated portion to be discarded, creates an image mask using the cut image, and that applies the image mask to the image to be printed to create a modified image in which the at least one portion to be kept is exposed and the at least one portion to be discarded is hidden by the image mask, a printing device that apples colorant only to the at least one portion to be kept of the modified image, which is exposed by the image mask, to create an outputted image with colorant only on the at least one portion to be kept, and a cutting device that cuts away the at least one portion to be discarded of the modified image, which is hidden by the image mask, so that the at least one portion to be discarded is not included in the outputted image.

According to an aspect of the embodiment, the graphics design tool adds a margin to the cutting pattern to create a margin area between the margin and the at least one portion to be kept.

According to an aspect of the embodiment, the margin area also is a portion to be kept in the modified image.

According to an aspect of the embodiment, the printing device adds colorant to the margin area.

According to an aspect of the embodiment, the colorant applied to the margin area is a different color than the colorant applied to the at least one portion to be kept.

According to an aspect of the embodiment, the modified image is changed to match edits or changes to the cut image whenever the cut image is edited or changed.

According to an aspect of the embodiment, the printing device and the cutting device are integrated into a single device.

According to another embodiment, there is provided an image forming method which comprises marking a cutting pattern over an image to be printed, creating a cut image by designating portions of the cutting pattern as at least one portion to be kept in the image to be printed and at least one portion to be discarded in the image to be printed, creating an image mask using the cut image including information of the at least one designated portion to be kept and the at least one designated portion to be discarded, applying the image mask to the image to be printed to create a modified image in which the at least one portion to be kept is exposed and the at least one portion to be discarded is hidden by the image mask, applying colorant only to the at least one portion to be kept of the modified image, which is exposed by the image mask, to create an outputted image with colorant only on the at least one portion to be kept, and cutting away the at least one portion to be discarded of the modified image, which is hidden by the image mask, so that the at least one portion to be discarded is not included in the outputted image.

According to an aspect of the embodiment, the method further comprises adding a margin to the cutting pattern to create a margin area between the margin and the at least one portion to be kept.

According to an aspect of the embodiment, the margin area also is a portion to be kept in the modified image.

According to an aspect of the embodiment, the method further comprises adding colorant to the margin area.

According to an aspect of the embodiment, the colorant applied to the margin area is a different color than the colorant applied to the at least one portion to be kept.

According to an aspect of the embodiment, the margin is added to an outside of the cutting pattern.

According to an aspect of the embodiment, the margin is added to an inside of the cutting pattern.

According to an aspect of the embodiment, the method further comprises changing the modified image to match edits or changes to the cut image whenever the cut image is edited or changed.

According to a further embodiment, there is provided a computer-readable medium storing a driver containing an image forming control program including instructions for causing a computer to execute a process comprising a step of marking a cutting pattern over an image to be printed, a step of creating a cut image by designating portions of the cutting pattern as at least one portion to be kept in the image to be printed and at least one portion to be discarded in the image to be printed, a step of creating an image mask using the cut image including information of the at least one designated portion to be kept and the at least one designated portion to be discarded, a step of applying the image mask to the image to be printed to create a modified image in which the at least one portion to be kept is exposed and the at least one portion to be discarded is hidden by the image mask, a step of applying colorant only to the at least one portion to be kept of the modified image, which is exposed by the image mask, to create an outputted image with colorant only on the at least one portion to be kept, and a step of cutting away the at least one portion to be discarded of the modified image, which is hidden by the image mask, so that the at least one portion to be discarded is not included in the outputted image.

According to an aspect of the embodiment, the control program includes instructions for causing a computer to execute a step of adding a margin to the cutting pattern to create a margin area between the margin and the at least one portion to be kept.

According to an aspect of the embodiment, the control program includes instructions for causing a computer to execute a step of changing the modified image to match edits or changes to the cut image whenever the cut image is edited or changed.

Other subsidiary aspects of the present invention will be described below.

The image printing system, method and control program are more specifically described in the following paragraphs by reference to the drawings attached only by way of example.

BRIEF DESCRIPTION OF THE DRAWINGS

A more complete appreciation of the present invention, and many other attendant features and advantages thereof, will become readily apparent as the same becomes better understood by reference to the following detailed description when considered in conjunction with the accompanying drawings in which like reference symbols and reference numerals indicate the same or similar components, wherein.

DETAILED DESCRIPTION

A preferred embodiment of an image printing system of the present invention will be described below with reference to the accompanying drawings. However, the present invention shall not be limited only to the illustrated embodiments.

Figure 1:
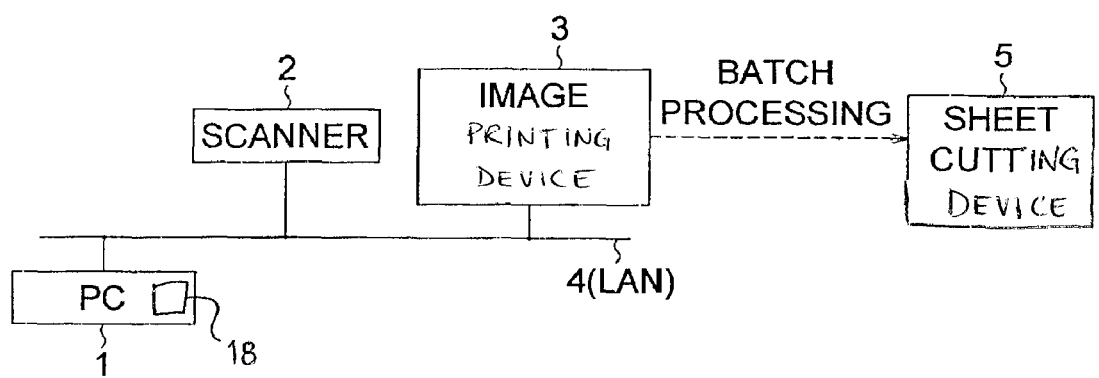
FIG. 1 is a block diagram illustrating a system configuration in accordance with an embodiment of the invention.

FIG. 1 is a block diagram of a configuration including an image forming system in accordance with the present embodiment. The system includes a computer (PC) 1, a scanner 2, a printing device 3, a LAN 4, and a sheet cutting device 5. The printing device 3 in accordance with the embodiment may be a printing device 3 alone or a printing device 3 including the function of the scanner 2.

The computer 1 may be a personal computer that provides image information such as image data, the number of pages of image formation, image forming sequence, etc., via LAN 4 to the printing device 3. The computer 1 includes a graphics design tool 18, discussed below, that allows a user to manipulate an image to be printed. The scanner 2 is a device that reads image data, and provides image information such as image data, number of pages of image formation, image forming sequence, etc., via LAN 4 to the printing device 3.

The printing device 3 employs an electro-photographic method and performs image forming on a sheet, based on image data and job data inputted from computer 1 or the scanner 2. The job data also can be input via an operation section (described later) which is included in the printing device 3. The printing device 3 may have a single sided mode to form an image on a single side of a sheet, a double sided mode to form an image on the both sides of a sheet, a sort mode to shift-eject a sheet P, and an inter-sheet mode to insert a front cover sheet or a back cover sheet.

The sheet cutting device 5 carries out the cutting operation of sheets by cutting away portions of an image which are not to be included in the final version of the outputted sheet, as discussed below. The sheet cutting device 5 may also cut to a prescribed size the bundle of sheets output from the printing device 3. The sheets output from the printing device 3 are set in the sheet cutting device 5 by batch processing by an operator. However, the sheets output from printing device 3 may also be set in the sheet cutting device 5 through automated mechanical means. For example, a conveyer (not shown) may be used. FIG. 1 shows an embodiment in which the printing device 3 and the sheet cutting device 5 are separate devices, i.e., the sheet cutting device 5 is located outside of the printing device 3. However, the printing device 3 and the sheet cutting device 5 may be integrated into a single device.

The LAN 4 receives and transmits image data and jobs through a communication cable between computer 1, the scanner 2, and the printing device 3, using, for example, a CSMA/CD (Carrier Sense Multiple Access with Collision Detection) method, etc.

Figure 2:
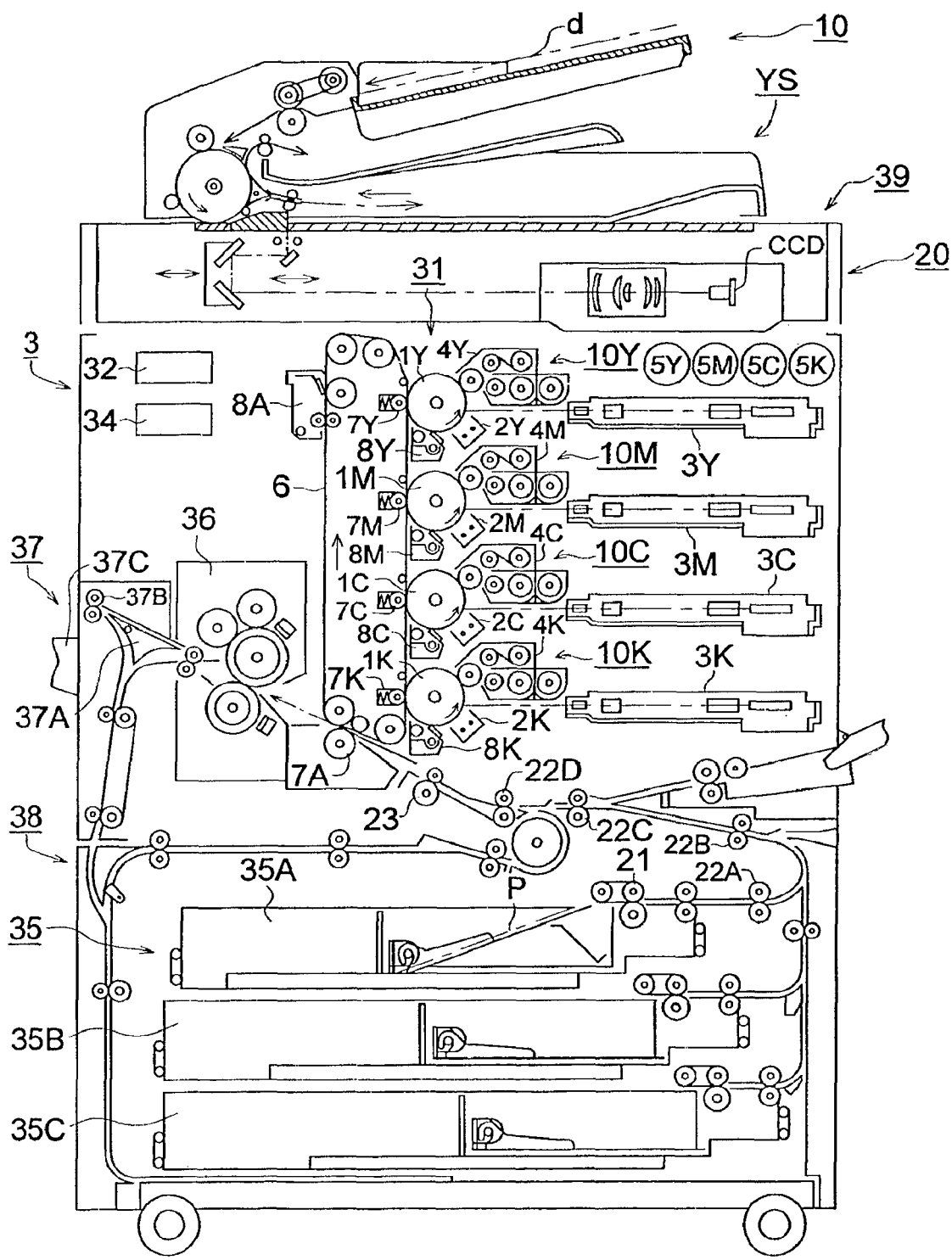
FIG. 2 is an overall configuration diagram of a printing device in accordance with the embodiment.

FIG. 2 is an overall configuration diagram of a color image forming apparatus with an electro-photographic method which allows image forming on both sides, as an example of an image forming apparatus in accordance with the present embodiment. The printing device 3 has a single sided mode to form an image on a single side of a sheet and a double sided mode to form an image on the both sides of a sheet.

In FIG. 2, the printing device 3 is shown as a multifunction peripheral (MFP) device. However, the printing device 3 may also constitute a device having only a printer function, because a scanning function and a copying function are not of particular interest to the present embodiment. The printing device 3 is of a so-called tandem type color image forming apparatus, and has an automatic document feeder 10, a document reading apparatus 20 having the scanner functions, an image forming section 31, an image processing section 32, image writing sections 3Y, 3M, 3C and 3K, a control section 34, a sheet feeding and conveying section 35, a sheet discharging section 37, a sheet discharging tray 37C and a re-conveying section 38 for carrying out automatic double sided copying. The image forming section 31 has plural sets of image forming sections 10Y, 10M, 10C and 10K, a belt-shaped intermediate transfer member 6, and a fixing unit 36.

The image forming section 10Y that forms images of yellow color has a photoreceptor 1Y which is the image forming body, a charger 2Y, an exposure unit 3Y, a developing unit 4Y, and a cleaning unit 8Y all of which are arranged in the neighborhood of the photoreceptor 1Y. The image forming section 10M that forms images of magenta color has a photoreceptor 1M which is the image forming body, a charger 2M, an exposure unit 3M, a developing unit 4M, and a cleaning unit 8M all of which are arranged in the neighborhood of the photoreceptor 1M. The image forming section 10C that forms images of cyan color has a photoreceptor 1C which is the image forming body, a charger 2C, an exposure unit 3C, a developing unit 4C, and a cleaning unit 8C all of which are arranged in the neighborhood of the photoreceptor 1C. The image forming section 10K that forms images of black color has a photoreceptor 1K which is the image forming body, a charger 2K, an exposure unit 3K, a developing unit 4K, and a cleaning unit 8K all of which are arranged in the neighborhood of the photoreceptor 1K. The charger 2Y and the exposure unit 3Y, the charger 2M and the exposure unit 3M, the charger 2C and the exposure unit 3C, the charger 2K and the exposure unit 3K constitute the latent image forming section.

The intermediate transfer member 6 is an endless belt entrained about a plurality of rollers to be freely rotated.

The images of each color formed by the image forming sections 10Y, 10M, 10C and 10K are successively transferred (primary transfer) onto the intermediate transfer member 6 by the transfer units 7Y, 7M, 7C and 7K, whereby a synthesized color image is formed. The sheets P stored in sheet feeding cassette 35A are fed by the sheet feeding unit 21. The sheets P pass through the sheet feeding rollers 22A, 22B, 22C and 22D and the registration roller 23, and are transferred to the transfer unit 7A, where the color image is transferred onto the sheets P (secondary transfer). Sheet feeding cassettes 35B and 35C have similar configurations. The sheets P onto which the color image has been transferred are subjected to heat-and-pressure fixing processing with a fixing section 36. The sheets P are sandwiched by a conveying roller 37B and an ejection roller 37C to be ejected and loaded onto a tray 37D outside of the apparatus.

On the other hand, after the color image is transferred onto the sheets P by the transfer unit 7A, the residual colorant on the intermediate transfer member from which the sheets P have been separated is removed by the cleaning unit 8A.

If the printing device 3 comprises an MFP, the printing device 3 also includes an image reader YS having the automatic document feeder 10 and the document reader 20, and being provided at the top of the printing device 3. A document d loaded on the document table of the automatic document feeder 10 is conveyed by a conveying unit, and an image on a single side or images on double sides of the document d are scanned and exposed by an optical system of the document reader 20 and read by a line image sensor CCD.

During the double sided mode, the sheets P having been finished with image forming on a first side and having passed the fixing section 36 are fed to the re-conveying unit 38 by a sheet-ejection-path switching plate 37A, and are again formed with an image on the second side in the image forming section 31. Thereafter, the sheets P are ejected and loaded onto a sheet-ejection tray 37D by the conveying roller 37B and the sheet-ejection roller 37C of the sheet ejection section 37.

In the case of sheet reverse-ejection in the single sided mode, a sheet P having been finished with image forming and passed the fixing section 36 is fed to the re-conveying unit 38 by the sheet ejection-path switching plate 37A. Then, the front side and the back side of the sheet P are reversed by reverse rotation of a conveying roller (not given with a reference numeral) of the re-conveying unit 38 and ejected onto the sheet ejection tray 37D by the conveying roller 37B and the ejection roller 37C.

The image processing section 32 is composed of a computational processor, image memory, interface, etc. The image processing section 32 takes in the image information sent from the computer 1 or the scanner 2 via the interface connected to the LAN 4, and carries out image processing at the time of outputting the image data within the image information. As shown in FIG. 2, the printing device 3 also includes an operation section 39. The operation section 39 has a display section such as an LCD (Liquid Crystal Display), and an input section such as a touch panel and ten-keys, etc., that makes it possible for a user to make and enter various settings at the time of carrying out image formation. The control section 34 includes a CPU, a memory, etc. and carries out comprehensive control of the printing device 3 based on information received from the image processing section 32 and the conditions set using the operation section 39.

Figure 3:
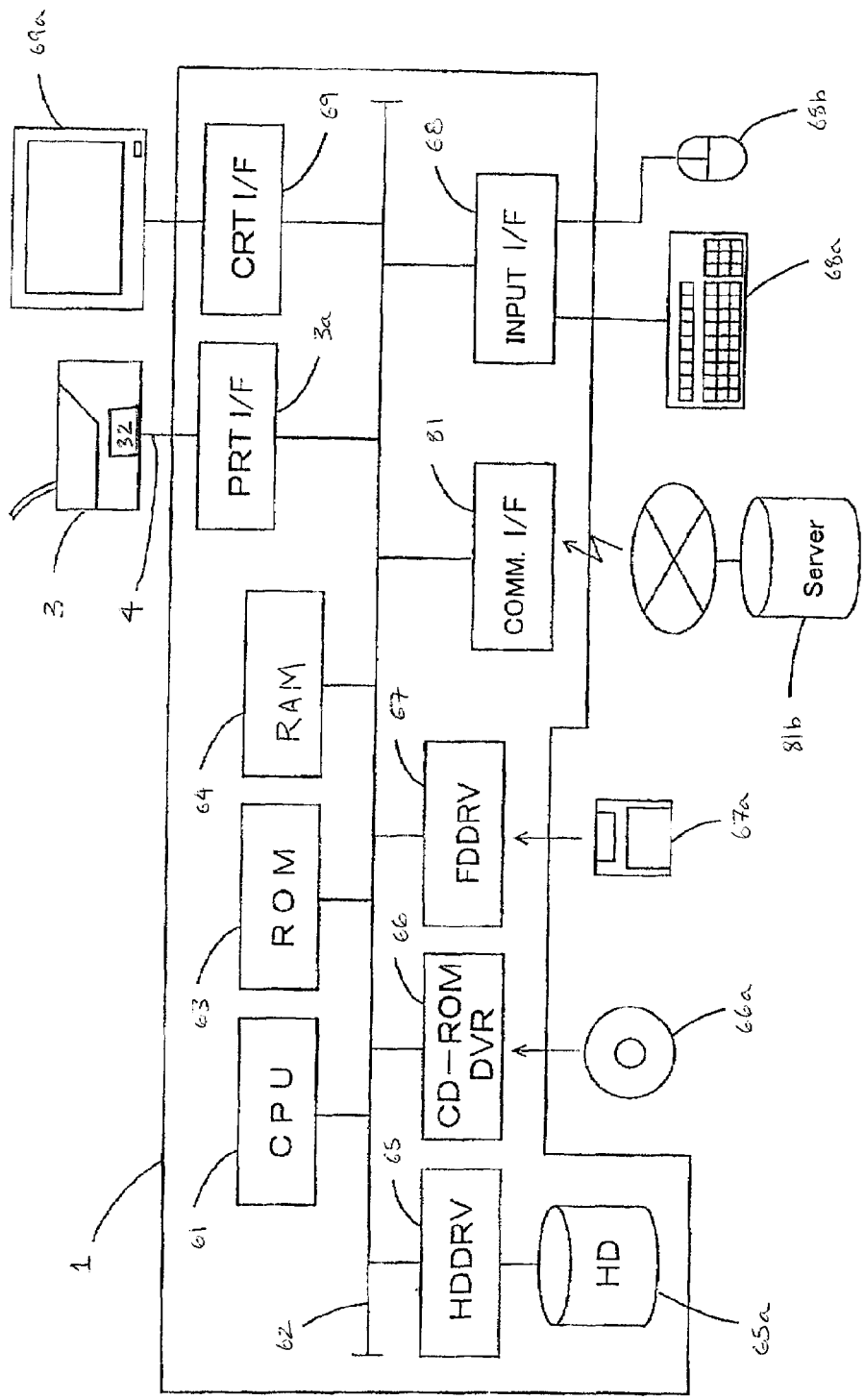
FIG. 3 is a simplified structural block diagram of a computer in accordance with the embodiment.

FIG. 3 is a simplified structural block diagram of the computer 1 in accordance with the embodiment. As shown in FIG. 3, the computer 1 includes a CPU 61 as the core element for computing. The CPU 61 can access a ROM 63 and a RAM 64 through a system bus 62. A hard disk drive 65, a CD-ROM drive 66 and a floppy disk drive 67 are connected to the system bus 62 as peripheral devices for external storage. Software, such as an operating system, application programs, and the graphics design tool 18, is stored in a hard disk 65a that is attached to the hard disk drive 65. The software is transferred to the RAM 64 if necessary under the control of the CPU 61. The CPU 61 accesses the RAM 64 and executes the software when necessary. That is, the CPU 61 executes types of programs while using the RAM 64 as a temporary working area.

An input interface 68 also is connected to the system bus 62, and a keyboard 68a and a mouse 68b, as input devices for user operation, are connected to the input interface 68. A CRT interface 69 is also connected to the system bus 62. A display 69a on which print images are displayed to the user is connected to the computer 1 via the CRT interface 69. Furthermore, a printing device interface 3a is connected to the system bus 62. The printing device 3 is connected to the computer 1 via the printer interface 3a. In particular, the printing device interface 3a is connected to the image processing section 32 of the printing device 3. Although the simplified configuration of the computer 1 is illustrated herein, any personal computer configured with generally used components can be used as the apparatus of the present preferred embodiment.

The computer 1 to which the present preferred embodiment is applied is, of course, not limited to a personal computer. While the so-called desktop computer is used as the apparatus of the present preferred embodiment, other types of computers such as a notebook-size computer and a computer that operates as a mobile terminal may be used.

In this embodiment of the configuration, the programs and the graphics design tool 18 are stored on the hard disk 65a. However, the software recording medium is not limited to the hard disk. The medium may be, for example, a CD-ROM 66a or a floppy disk 67a. The programs recorded on such an exchangeable recording medium is read by the CD-ROM drive 66 or the floppy disk drive 67, transferred into the computer 1, and installed into the hard disk 65a. The CPU 61 executes the programs transferred from the hard disk 65a into the RAM 64a for various kinds of processing as described above. In addition, a magneto-optic disk may be used as an exchangeable recording medium instead of the above-mentioned recording medium. Moreover, a nonvolatile semiconductor memory such as a flash card may be used. The computer 1 is connected to the network 4 through a communication interface 81 such as a modem connected to the system bus 62. The computer 1 may access a file server 81b which is connected to the network 4 and be capable of storing various kinds of programs, and download the required programs into the computer 1.

The image forming device 3 comprises a CPU, firmware, etc. which are not shown. According to a program described in the firmware, the printing device 3 receives data from which to print, comprising CMYK data, a page description language and other information, sent from the computer 1 through the printing device interface 3a. Based on the data from which to print, the printing device 3 executes printing by activating its driving devices for driving a print head and a sheet feeding cassettes 35A-C. The sheet cutting device 5 also comprises a CPU, firmware, etc. which are not shown. According to a program described in the firmware, the sheet cutting device 5 receives data from which to cut an image to be printed sent from the printing device 3. Based on the data from which to cut, the sheet cutting device 5 executes cutting of a printed image by activating its driving devices for cutting the printed image on an sheet outputted from the image forming device 3.

Figure 4:
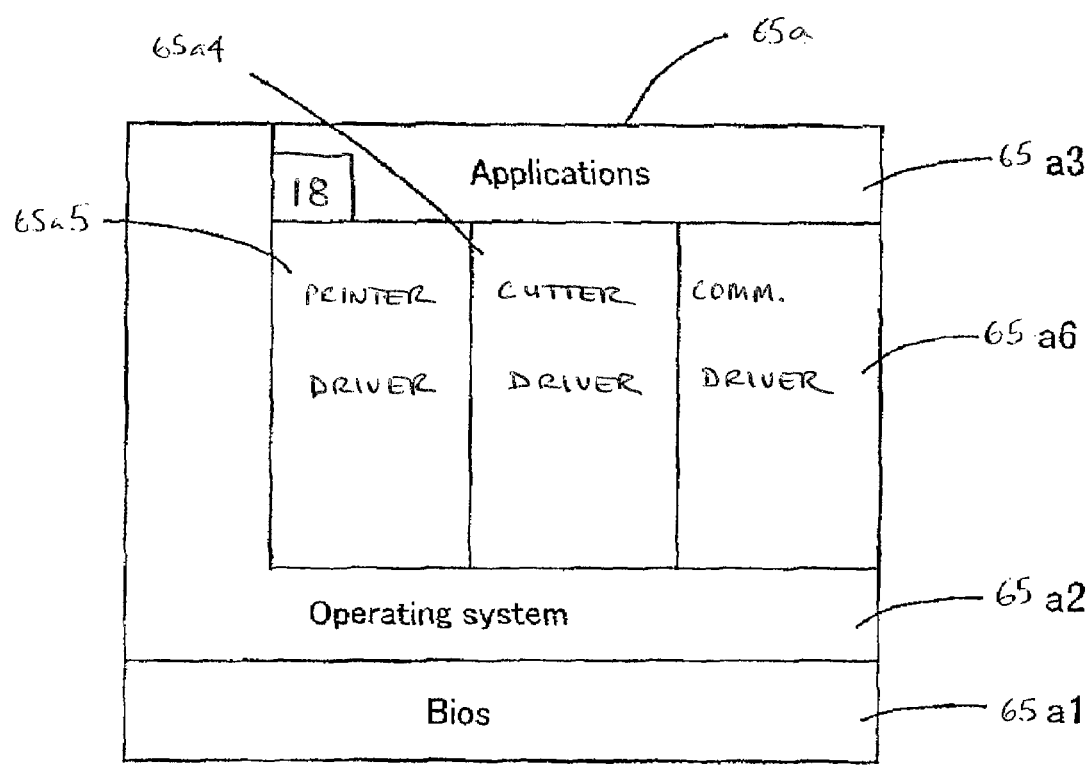
FIG. 4 is a schematic diagram of a simplified software organization stored onto the hard disk of the computer.

Software stored on the hard disk 65a is run on the personal computer 1. The software may be organized as represented in FIG. 4. Referring to FIG. 4, BIOS 65a1 is executed on the above-described underlying hardware. An operating system 65a2 and application programs 65a3 are executed over the BIOS 65a1. In general, the operating system 65a2 accesses the hardware directly or via the BIOS 65a1 and the application programs 65a3 transfer data to/from the hardware via the operating system 65a2. For example, when an application program is reading data from the hard disk 65a, the application program accesses the hardware via the operating system 65a2. In the present embodiment, the graphics design tool 18 is one of the application programs 65a3 that is executed over the BIOS 65a1.

Moreover, drivers of various kinds for controlling the hardware may be integrated into the operating system 65a2. The drivers integrated into the operating system 65a2 perform control actions as part of the operating system. The drivers integrated into the operating system may include a display driver (not shown) for controlling the above-mentioned CRT interface 69, a communication driver 65a6 for controlling the communication interface 81, a printer driver 65a5 for controlling the printing device 3, and a cutter driver 65a4 for controlling the sheet cutting device 5.

As described above, the printer driver 65a5 is integrated into the operating system 65a2 to run on the computer 1. Upon receiving image data from which to print from an application program 65a3, the printer driver 65a5, among other actions discussed below, performs processing such as generating data from which to print and generating preview images. The printer driver 65a5 comprises a driver module generating an intermediate file for print. The file receives print job data based on RGB color elements and generates a spool file. The driver module can output a spooler activation/deactivation signal and supply it to a spooler (not shown) to activate the spooler whenever a spool file is generated. The spooler receives the spool file from the printer driver 65a5 and spools it onto the hard disk 65a. The spooler also receives actual data for print generated by the printer driver 65a5 and sends that data via the printer interface 3a to the printing device 3 so that the printing device 3 can print an image from that data. The printer driver 65a5 also comprises a module generating preview data by which the data in the spool file spooled on the hard disk 65a can be converted to bitmap data from which preview images are displayed.

Figure 5A:
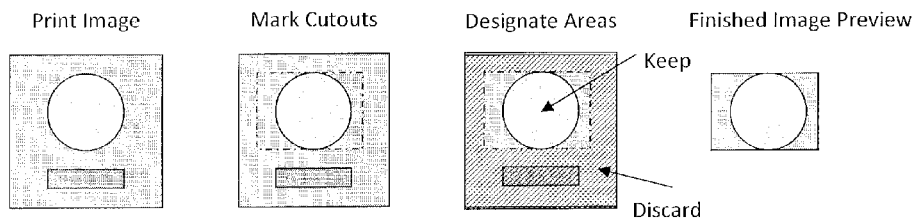
FIG. 5a illustrates the basic stages for outputting a printed result from a user's perspective.

In the present embodiment, the graphics design tool 18 is an application program activated from the driver module of the printer driver 65a5. The graphics design tool 18 receives information of an image to be printed and generates preview data that is displayed on the display 19a through the CRT interface 19 using the bitmap data generated by the printer driver 65a5. The preview data displays an original image that corresponds to the Print Image shown in FIG. 5a. A user may desire to edit the original/Print Image by cutting away some of the portions of the image after the image is printed to obtain a finished result. FIG. 5a illustrates the basic stages for outputting such a finished result, according to the user's perspective. For example, by using the graphics design tool 18 in conjunction with the keyboard 68a and mouse 68b as input devices for user operation, the user can draw or mark a cutting pattern over the preview of the Print Image. This is shown in FIG. 5a as "Mark Cutouts". The user then designates portions of the edited Print Image as portions to be kept ("Keep" in FIG. 5a) in the image to be printed and portions to be discarded in the image to be printed ("Discard" in FIG. 5a). For example, the user may "left click" or "right click" on the edited Print Image using the left-side or right-side button of the mouse 68b to designate the "Keep" and "Discard" portions. After the designations are completed, the graphics design tool 18 displays a Finished Image Preview for the user according to the cutting pattern and the user's designations. The Finished Image Preview displays a preview of the Print Image having the portions to be discarded cut away from the Print Image. If the Finished Image Preview is acceptable to the user, Cut Image data is ultimately sent to the printing device 3 and the sheet cutting device 5 to print and cut the image to obtain a finished result.

Figure 5B:
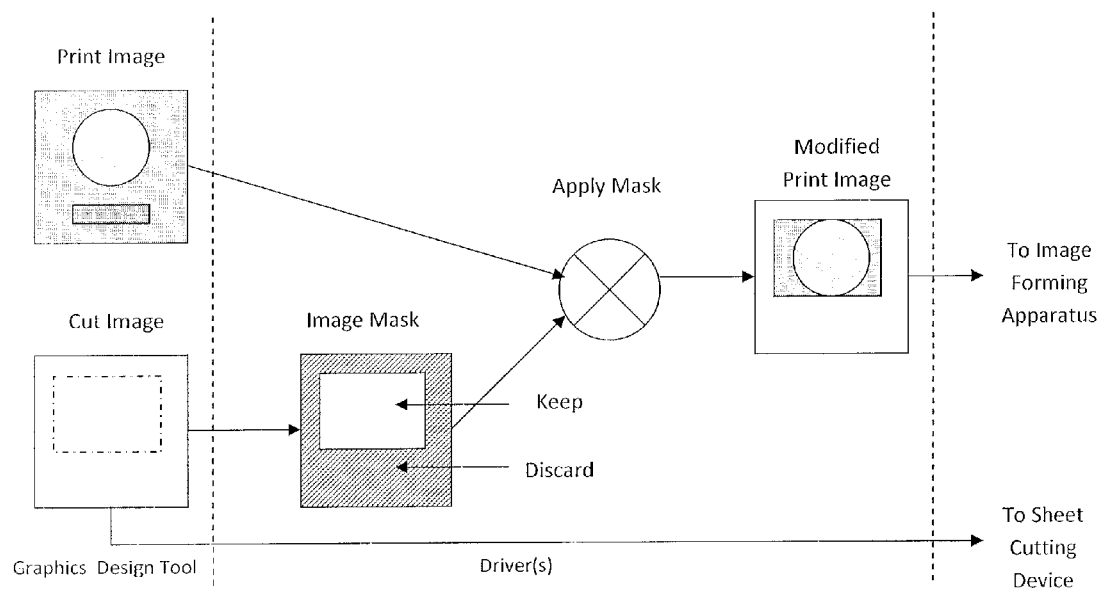
FIG. 5b illustrates the basic stages for outputting a printed result from a perspective of a graphics design tool stored in the hard disk of the computer.

FIG. 5b illustrates the basic stages for outputting a printed result from a perspective of the graphics design tool 18 stored on the hard disk 65a of the personal computer 1. As discussed above, the graphics design tool 18 receives an image to be printed (Print Image), and marks a cutting pattern over the Print Image according to the user's specifications. The graphics design tool 18 classifies portions of the cutting pattern as portions to be kept in the image to be printed ("Keep" in FIG. 5a) and portions to be discarded in the image to be printed ("Discard" in FIG. 5a) to create a Cut Image shown in FIG. 5b. The graphics design tool 18 then sends the Cut Image and associated information (i.e., information of the designated portions to be kept and the designated portions to be discarded, among other relevant information) to, for example, the printer driver 65a5. The printer driver 65a5 utilizes the Cut Image to create an Image Mask as shown in FIG. 5b. In some embodiments, the graphics design tool 18 may send the Cut Image and associated information to the cutter driver 65a4 instead of the printer driver 65a5. In other embodiments, both the printer driver 65a5 and the cutter driver 65a4 may receive the Cut Image and associated information and share in the processing of the Cut Image. For example, the cutter driver 65a4 may convert the Cut Image into the Image Mask and send the Image Mask to the printer driver 65a5. The printer driver 65a5 may then send the Image Mask and Print Image to the printing device 3, and the printing device firmware can apply the Image Mask. In the instant embodiment, the printer driver 65a5 utilizes the Cut Image to create an Image Mask as shown in FIG. 5b. The Image Mask may be a template of the Cut Image that includes the designated portions to be kept and the designated portions to be discarded. For example, the portions of Image Mask corresponding to the portions to be kept are transparent and the portions of Image Mask corresponding to the portions to be discarded are opaque. The printer driver 65a5 applies the Image Mask over the Print Image to create a Modified Print Image such that where there are transparent areas of the Image Mask over the Print Image, the underlying Print Image pixels are output to the corresponding area of the Modified Print Image. Where there are opaque areas of the Image Mask over the Print Image, no underlying Print Image pixels are output to the corresponding area of the Modified Print Image. Accordingly, the portions of the Print Image to be kept are exposed by the Image Mask and the portions of the Print Image to be discarded are hidden by the Image Mask. In this regard, the Modified Print Image includes image pixel information (e.g., pixel color information) in areas of the image corresponding to the designated portions to be kept of the Print Image. The pixels in the portions of the Print Image that are hidden by the Image Mask are set to zero, or to provide "blank" pixel information. For instance, if each pixel has a Cyan, Magenta, Yellow and Black value in a CMYK image, setting a pixel's C, M, Y, and K value to zero tells the printer device 3 to not apply colorant (i.e., to apply a blank color) at that pixel location. Therefore, colorant is not applied to an area of an image having "blank" image pixel information. Thus, no toner or ink is applied to the Modified Print Image in the areas corresponding to the designated portions to be discarded, which are hidden by the Image Mask.

In the embodiment shown in FIG. 5b, the graphics design tool 18 generates the Cut Image, and the printer driver 65a5 and/or the cutter driver 65a4 creates the Image Mask and applies the Image Mask to the original Print Image to create a Modified Print Image. However, the image forming system in not limited to this configuration. For example, the graphics design tool 18 may create the Image Mask and apply the Image Mask to the original Print Image to create a Modified Print Image. In this case, the graphics design tool 18 sends the Modified Print Image to the printer driver 65a5 and/or the cutter driver 65a4.

In either configuration, the printer driver 65a5 then generates bitmap data according to the Modified Print Image. When a print job is executed, the driver module discussed above activates the spooler and transfers the Modified Print Image data to the spooler. The Modified Print Image data is sent from the spooler to the printing device 3 via the printing device interface 3a and the image processing section 32. Thus, the Modified Print Image is sent to the printing device 3 in place of the Print Image. The Cut Image is sent to the sheet cutting device 5 to provide the sheet cutting device 5 with information regarding where to cut the printed Modified Print Image to obtain an outputted finished result matching the image specified by the user (see Finished Image Preview in FIG. 5a). According to the embodiment, the original Print Image can be unmodified as it is used to create the Modified Print Image. Therefore, there is no need for the user to create a user-edited copy of the original Print Image, as is necessary in the manual approach discussed above. Further, because the Modified Print Image will automatically match edits or changes to the Cut Image whenever the Cut Image is edited, users will not need to manually perform any editing of the Modified Print Image after editing the Cut Image, as is required in the manual approach discussed above.

When the Modified Print Image is received at the image processing section 32 of the printing device 3, the control section 34 controls the printing device 3 to apply colorant only to the portions of the Modified Print Image having color information, i.e., the portions of the Print Image exposed by the Image Mask. In this manner, the printing device 3 is controlled to apply colorant only to the portions of the original Print Image designated as portions to be kept. After the colorant is applied to the Modified Image, the Modified Image is printed by the printing device 3. The printed sheet is then sent to the sheet cutting device 5, for example, by batch processing as shown in FIG. 1. However, the sheets may also be set in the sheet cutting device 5 through automated mechanical means, such as through a conveyer. In the embodiment, the printing device 3 and the sheet cutting device 5 are separate devices. That is, the sheet cutting device 5 is located outside of the printing device 3. However, the printing device 3 and the sheet cutting device 5 may be integrated into a single device, such that the user does not receive an outputted sheet until the sheet is processed by the sheet cutting device 5. The sheet cutting device 5 utilizes the Cut Image information to cut away from the printed sheet the portions of Modified Print Image that are designated as to be discarded, i.e., the portions of the Print Image hidden by the Image Mask, so that these portions not included in the outputted finished result.

The image forming system of the embodiment prevents the application of colorant on unnecessary or discarded cutouts of an outputted printed image. In particular, the image forming system allows a user to automatically prevent colorant from being printed on the areas of an image meant to be discarded after the cutting process. As a result, the waste of colorant when outputting a printed image can be prevented. Preventing the wasteful use of unnecessary colorant on discarded areas of the image to be printed reduces the amount of colorant used in a printing operation, thereby reducing printing costs. Further, the image forming system eliminates overall burden of manually editing the print image to remove colors from areas intended to be discarded.

Figure 6:
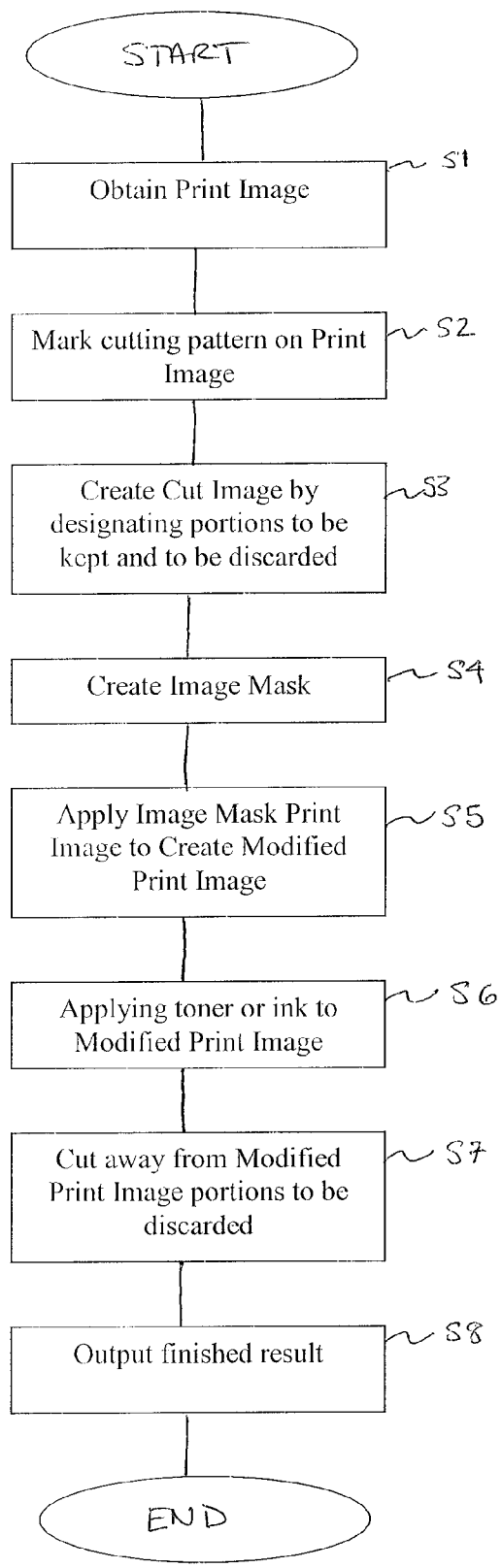
FIG. 6 illustrates the steps of an image forming method according to the embodiment.

An image forming method according to the embodiment will now be described with respect to FIG. 6.

At step S1, a Print Image is obtained at, for example, at the computer 1. The Print Image may be obtained from image information downloaded from a digital camera, image information downloaded from the Internet, or image data created by a user utilizing the computer 1. The graphics design tool 18 receives the image information from the computer 1 and creates an image to be printed, or "Print Image". The graphics design tool 18 may then generate a preview of the Print Image, for example, on the display 19a using the bitmap data generated by the printer driver 65a5.

At step S2, the graphics design tool 18 is controlled to mark or draw a cutting pattern over the Print Image. The graphics design tool 18 may be controlled by operating the keyboard 68*a* and/or mouse 68*b*. An example of a cutting pattern is shown in FIG. 5*a* under "Mark Cutouts".

At step S3, portions of the cutting pattern are designated as at least one portion to be kept in the Print Image and at least one portion to be discarded in the Print Image. These designations may be performed by the graphics design tool 18 in conjunction with the keyboard 68*a* and/or mouse 68*b*. For example, portions of the cutting pattern may be designated as "Keep" or "Discard" by a "left click" or "right click" operation of the mouse 68*b*. Once the designation process is completed, the graphics design tool 18 creates a Cut Image using the information of the portions to be kept in the Print Image and the portions to be discarded.

At step S4, an Image Mask is created using the Cut Image. As discussed above, either the graphics design tool 18 or the printer driver 65*a*5 and/or the cutter driver 65*a*4 creates the Image Mask.

At step S5, the Image Mask is applied to the Print Image. As discussed above, the portions of Image Mask corresponding to the portions of the Print Image to be kept may be transparent, and the portions of Image Mask corresponding to the portions of the Print Image to be discarded may be opaque. When the Image Mask is placed over the Print Image, a Modified Print Image is created in which where there are transparent areas of the Image Mask over the Print Image, and the underlying Print Image pixel information is output to the corresponding area of the Modified Print Image. Where there are opaque areas of the Image Mask over the Print Image, the underlying Print Image pixel information is set to zero, or set to provide "blank" pixel information. Thus, in the Modified Print Image, the portions to be kept are exposed and the portions to be discarded are hidden, as discussed above. The Modified Print Image is then sent to the printing device 3.

At step S6, the printing device 3 is controlled by the control section 34 to apply colorant to the Modified Print Image. Specifically, the printing device 3 is controlled to apply colorant only to the portions of the Modified Print Image having image pixel information, i.e., the portions of the Print Image exposed by the Image Mask. No colorant is applied to an area of the Modified Print Image having "blank" image pixel information, as discussed above. Thus, no colorant is applied to the Modified Print Image in the areas corresponding to the designated portions to be discarded. The printing device 3 then creates an outputs the Modified Print Image.

At step S7, portions of the of Modified Image that are designated as to be discarded, i.e., the portions of the Print Image hidden by the Image Mask, are cut away, so that these portions not included in the outputted image. The cutting is performed by the sheet cutting device using the Cut Image information of step S3.

At step S8, the finished result, i.e., the cut Modified Print Image, is outputted from the sheet cutting device 5, and the process ends. The image forming method prevents the application of colorant on unnecessary or discarded cutouts of an outputted printed image. As a result, the waste of colorant when outputting a printed image can be prevented.

In the above embodiment, the printer driver 65*a*5 and the cutter driver 65*a*4 are stored on the hard disk 65*a*. However, the printer driver 65*a*5 and the cutter driver 65*a*4 may instead be stored on another computer-readable medium, for example, the CD-ROM 66*a*. In this regard, an image forming control program according to the embodiment will now be described. The description is an example of a computer program incorporating steps of the image forming method described above.

For example, the CD-ROM 66*a* stores the printer driver 65*a*5 and/or the cutter driver 65*a*4, which individually or in combination may contain an image forming control program including instructions for causing the computer 1 to execute a process including the following steps. The step of marking a cutting pattern over an image to be printed. The step of creating a cut image by designating portions of the cutting pattern as at least one portion to be kept in the image to be printed and at least one portion to be discarded in the image to be printed. The step of creating an image mask using the cut image including information of the at least one designated portion to be kept and the at least one designated portion to be discarded. The step of applying the image mask to the image to be printed to create a modified image in which the at least one portion to be kept is exposed and the at least one portion to be discarded is hidden by the image mask. The step of sending instructions to a printing device for applying colorant only to the at least one portion to be kept of the modified image, which is exposed by the image mask, to create an outputted image with toner or ink only on the at least one portion to be kept. The step of sending instructions to a cutting device for cutting away the at least one portion to be discarded of the modified image, which is hidden by the image mask, so that the at least one portion to be discarded is not included in the outputted image.

Various other aspects of the image forming system, method and control program will now be described. Although the following aspects may be described with respect to only the image forming system, it is understood that the aspects apply equally to the method and the control program as well, and may be incorporated into all of the embodiments and alternatives discussed above.

Figure 7:
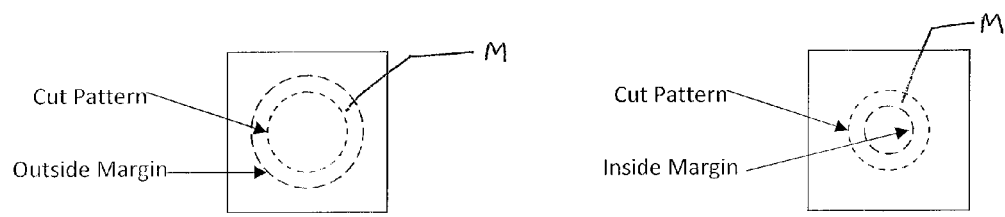
FIG. 7 illustrates an aspect of the embodiment in which a margin is added to the cutting pattern on a Print Image.

In one aspect of the image forming system, the graphics design tool 18 adds a margin to the cutting pattern to create a margin area M between the margin and the at least one portion to be kept, as shown in FIG. 7. FIG. 7 shows examples of an Inside Margin and an Outside Margin. Margins allow a user to resolve problems related to inaccuracy of the sheet cutting device 5, and may also be used for generating an artistic effect as well, such as to create an image frame, discussed below.

A margin may match the shape of a cutting pattern, and may extend from inside or from outside the cutting pattern by a specified amount. The amount may be specified in terms of millimeters, inches, pixels, a percent, and the like. Alternatively, a user may click-and-drag a margin using the mouse 68*b* to customize the size of the margin. Further, the margin area M may be set by the graphics design tool 18 or the user to keep or discard underlying print data. Thus, in instances where the margin area M is designated as a portion to be kept in the Modified Print Image, the printing device 3 may fill the margin area M with a specified color. In this regard, the colorant applied to the margin area M may be of a color different from the colorant applied to the portion to be kept in order to create an artistic frame. The graphics design tool 18 may also have a margin transparency setting to allow for blending of multiple margins. Thus, if two or more cutting patterns on the Print Image have overlapping margins, and the settings for each of the overlapping margins conflict (for example, one margin is set to have a blue fill color and the other margin is set to have a red fill color), the user can layer the margins and select one of the margins to be a layer 'on top' of the other margin and have priority over the lower layer. In this manner, the user may define a certain stacking order for the margins that gives priority to particular margins.

Figure 8:
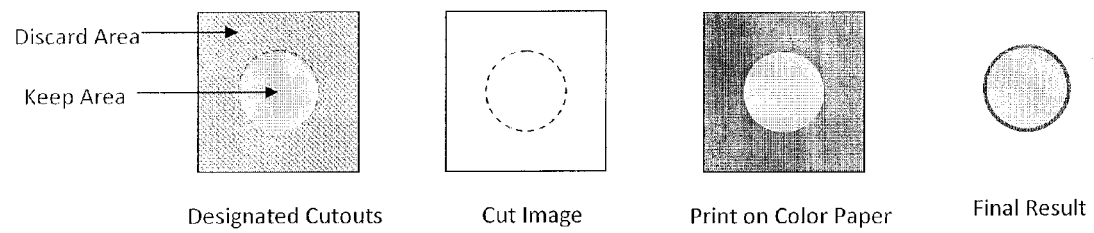
FIG. 8 illustrates a border added to an outputted finished result.
Figure 9:
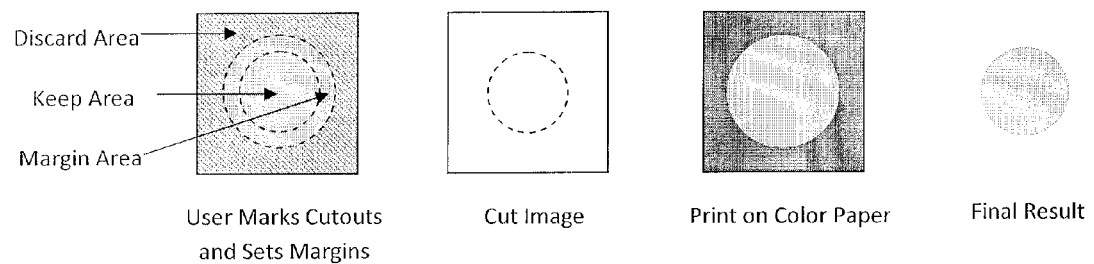
FIG. 9 illustrates an aspect of the embodiment in which a margin is added to the cutting pattern on a Print Image to account for cutting device inaccuracy.

Although a fully-printed cutout may be desired by a user, it may be desirable for the Modified Image to have a margin area M that does not include colorant (i.e., that exposes the color of the printing sheet) for artistic affect as shown in FIG. 8 (see "Final Result"). Another reason for having a margin area M that does not include colorant is to compensate for cutting device inaccuracy. If the cutting device 5 is not cutting accurately, the cuts may extend into the portions of the Modified Print Image to be discarded. That is, because no colorant is applied to the portions of the Modified Print Image to be discarded, the color of the printing sheet will show in areas of the outputted finished result where the cutting device veered off course into the area to be discarded. If the color of the printing sheet is exposed in these areas, the user may be alerted that the cutting device 5 should be recalibrated. In such a situation, however, the user may add an Outside Margin to the printing pattern, as shown in FIG. 9, that is beyond the tolerance of the cutting device 5. The user specifies the Margin Area as a portion to be kept and filled with colorant so that there is printed data present at the edges after a cut (see "Print on Color Paper" in FIG. 9). In this way the color of the printing sheet, which would normally be exposed because of sheet cutting device inaccuracy, is covered by colorant (see "Final Result" in FIG. 9). After adjusting the margin to account for cutting device inaccuracy, the user can choose to fill the Margin Area with an arbitrary color or to keep the underlying Print Image, effectively increasing the printing area around the cut.

Figure 10:
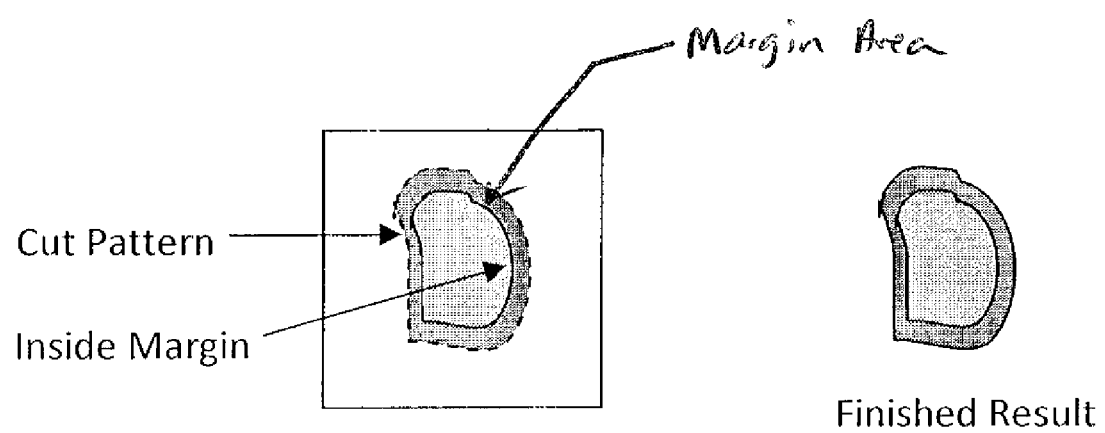
FIG. 10 illustrates an example of adding an inside margin to create an artistic affect.

As another example, a user may add an Inside Margin to the cutting pattern to create an artistic affect. As shown in FIG. 10, the Inside Margin creates a Margin Area that provides a printed or paper-colored border to an outputted finished result. That is, the user may either have the graphics design tool 18 add a particular color to the Margin Area, or may elect to discard the underlying print data and have the Margin Area defined by the color of the printing sheet.

Many other margin options are possible. For example, the graphics design tool 18 may provide preset fill designs for the margin areas, such as such patterns, textures, and the like. In addition, the graphics design tool 18 may provide multiple margins for a single cutting pattern. For example, a user may wish to avoid problems associated with cutting device inaccuracy by adding an Outside Margin, as well as adding a margin to create an artistic border with an Inside Margin. Thus, there is no requirement that only one margin can be associated with a cutting pattern. In addition, although the margins may be tools used primarily to affect print data around a cutting pattern, the margins may also be used to provide cutting instructions to the sheet cutting device 5. Furthermore, margin areas may be coupled and decoupled from a cutting pattern to allow a user to move a margin area to a different position unrelated to the position of the cutting pattern. Additionally, the margins can be used to create cutting device profiles to resolve cutting accuracy issues in sheet cutting device. These profiles can be used to set intelligent margin defaults to ensure accurate results each time a particular sheet cutting device is used.

While the invention has been described with reference to the above embodiments, it is to be understood that the invention is not limited only to the above embodiments or constructions. The invention is intended to cover various modifications and equivalent arrangements. In addition, while the various elements of the above embodiments are shown in various combinations and configurations, that are exemplary, other combinations and configurations, including more, less or only a single element, are also within the spirit and scope of the invention.

What is claimed is:

1. An image forming system comprising:
a graphics design tool that receives an image to be printed, marks a cutting pattern over the image to be printed, and generates a cut image by designating portions of the cutting pattern as at least one portion to be kept in the image to be printed and at least one portion to be discarded in the image to be printed, and wherein the graphics design tool adds a margin to the cutting pattern to create a margin area between the margin and the at least one portion to be kept, and wherein the margin area extends from the at least one portion to be kept to the at least one portion to be discarded;
a unit that receives the cut image including information of the at least one designated portion to be kept, the margin area, and the at least one designated portion to be discarded, creates an image mask using the cut image and the margin area, and applies the image mask to the image to be printed to create a modified image in which the at least one portion to be kept and the margin area are exposed and the at least one portion to be discarded is hidden by the image mask;
a printing device that applies colorant only to the at least one portion to be kept of the modified image and the margin area, which are exposed by the image mask, to create an outputted image with colorant only on the at least one portion to be kept and the margin area; and
a cutting device that cuts away the at least one portion to be discarded of the modified image, which is hidden by the image mask and the margin area, so that the at least one portion to be discarded and the margin area are not included in the outputted image.

2. The image forming system according to claim 1, wherein the colorant applied to the margin area is a different color than the colorant applied to the at least one portion to be kept.

3. The image forming system according to claim 1, wherein the modified image is changed to match edits or changes to the cut image whenever the cut image is edited or changed.

4. The image forming system according to claim 1, wherein the printing device and the cutting device are integrated into a single device.

5. An image forming method comprising:
marking a cutting pattern over an image to be printed;
creating a cut image by designating portions of the cutting pattern as at least one portion to be kept in the image to be printed and at least one portion to be discarded in the image to be printed;
adding a margin to the cutting pattern to create a margin area between the margin and the at least one portion to be kept, and wherein the margin area extends from the at least one portion to be kept to the at least one portion to be discarded;
creating an image mask using the cut image including information of the at least one designated portion to be kept, the margin area, and the at least one designated portion to be discarded;
applying the image mask to the image to be printed to create a modified image in which the at least one portion to be kept and the margin area are exposed and the at least one portion to be discarded is hidden by the image mask;
applying colorant only to the at least one portion to be kept and the margin area of the modified image, which are exposed by the image mask, to create an outputted image with colorant only on the at least one portion to be kept and the margin area; and cutting away the at least one portion to be discarded of the modified image, which is hidden by the image mask, and the margin area, so that the at least one portion to be discarded and the margin area are not included in the outputted image.

6. The image forming method according to claim 5, wherein the colorant applied to the margin area is a different color than the colorant applied to the at least one portion to be kept.

7. The image forming method according to claim 5, further comprising changing the modified image to match edits or changes to the cut image whenever the cut image is edited or changed.

8. A non-transitory computer-readable medium storing an image forming control program including instructions for causing a computer to execute a process comprising:
   marking a cutting pattern over an image to be printed;
   creating a cut image by designating portions of the cutting pattern as at least one portion to be kept in the image to be printed and at least one portion to be discarded in the image to be printed;
   adding a margin to the cutting pattern to create a margin area between the margin and the at least one portion to be kept, and wherein the margin area extends from the at least one portion to be kept to the at least one portion to be discarded;
   creating an image mask using the cut image including information of the at least one designated portion to be kept, the margin area, and the at least one designated portion to be discarded;
   applying the image mask to the image to be printed to create a modified image in which the at least one portion to be kept and the margin area are exposed and the at least one portion to be discarded is hidden by the image mask;
   sending instructions to a printing device for applying colorant only to the at least one portion to be kept of the modified image and the margin area, which are exposed by the image mask, to create an outputted image with colorant only on the at least one portion to be kept and the margin area; and
   sending instructions to a cutting device for cutting away the at least one portion to be discarded of the modified image, which is hidden by the image mask, and the margin area, so that the at least one portion to be discarded and the margin area are not included in the outputted image.

9. The computer-readable medium according to the claim 8, wherein the control program includes instructions for causing a computer to execute a step of changing the modified image to match edits or changes to the cut image whenever the cut image is edited or changed.

10. The computer-readable medium according to the claim 8, wherein the control program includes instructions for causing a computer to execute a step of wherein the colorant applied to the margin area is a different color than the colorant applied to the at least one portion to be kept.

* * * * *